United States Patent [19]

Wolf

[11] 4,164,247

[45] Aug. 14, 1979

[54] TREE AND STUMP SPLITTER

[76] Inventor: Robert H. Wolf, 408 S. Willow St., Flora, Ind. 46929

[21] Appl. No.: 872,621

[22] Filed: Jan. 26, 1978

Related U.S. Application Data

[62] Division of Ser. No. 743,487, Nov. 19, 1976, Pat. No. 4,094,348.

[51] Int. Cl.² ............................................. A01G 23/08
[52] U.S. Cl. .................................. 144/34 F; 414/723; 414/607; 403/44
[58] Field of Search ............ 144/34 R, 34 F, 309 AC; 403/43, 44, 45, 46, 47, 48; 214/145 A, 620

[56] References Cited

U.S. PATENT DOCUMENTS

| | | | |
|---|---|---|---|
| 2,559,816 | 7/1951 | Alexander | 144/34 F |
| 2,573,921 | 11/1951 | McNamara, Jr. | 144/34 F |
| 2,633,880 | 4/1953 | Mattson | 144/34 F |
| 2,821,217 | 1/1958 | Shald | 144/34 F |

Primary Examiner—Robert Louis Spruill
Assistant Examiner—W. D. Bray
Attorney, Agent, or Firm—Victor J. Evans & Co.

[57] ABSTRACT

A tree and stump splitter having a vertical edged splitting blade, a horizontal cut off blade, and quick attachment means to secure the splitter to a bulldozer blade.

3 Claims, 4 Drawing Figures

TREE AND STUMP SPLITTER

CROSS REFERENCE TO RELATED APPLICATION

This application is a Divisional Application of my copending application Ser. No. 743,487, field Nov. 19, 1976, now Patent No. 4,094,348 entitled TREE AND STUMP SPLITTER, issued on June 13, 1978.

BACKGROUND OF THE INVENTION

1. FIELD OF THE INVENTION

In grading land it frequently happens that the land has, or has had trees growing on it which makes grading with only a bulldozer impossible.

It is an object of the present invention, therefore, to provide a device that may be easily and quickly mounted on a bulldozer blade so that trees, or stumps of trees encountered in clearing and grading land may be removed for burning or other disposition without requiring digging or blasting.

Other and further objects and advantages will appear from the following specification taken with the accompanying drawings in which like reference characters refer to similar parts in the several views.

DESCRIPTION OF THE PREFERRED EMBODIMENT

Figure 1:
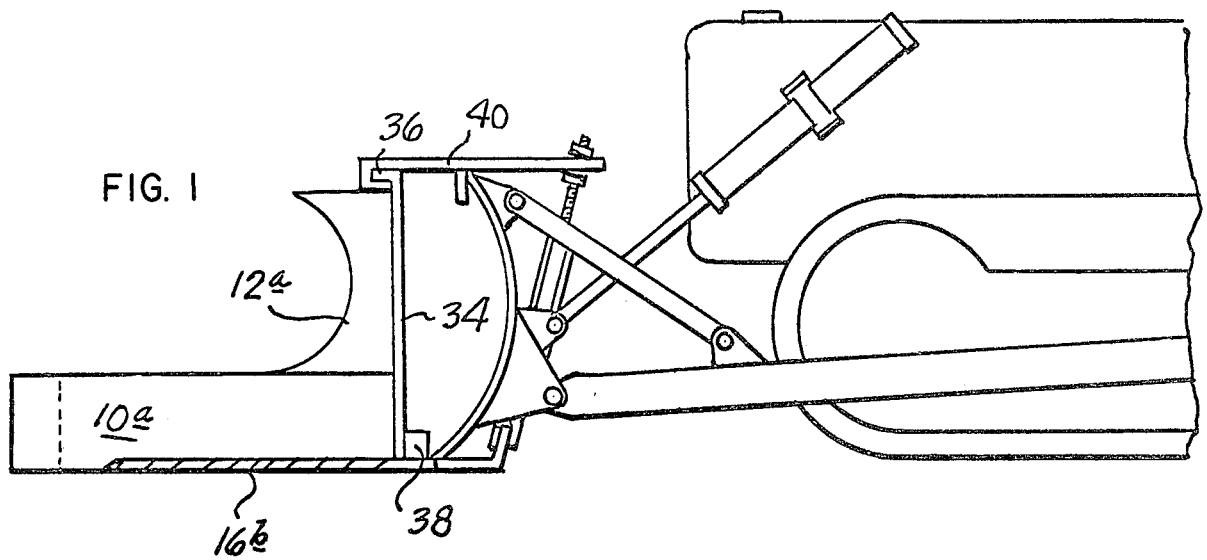
FIG. 1 is an elevation view showing a splitter and mount for a splitter on a bulldozer.
Figure 2:
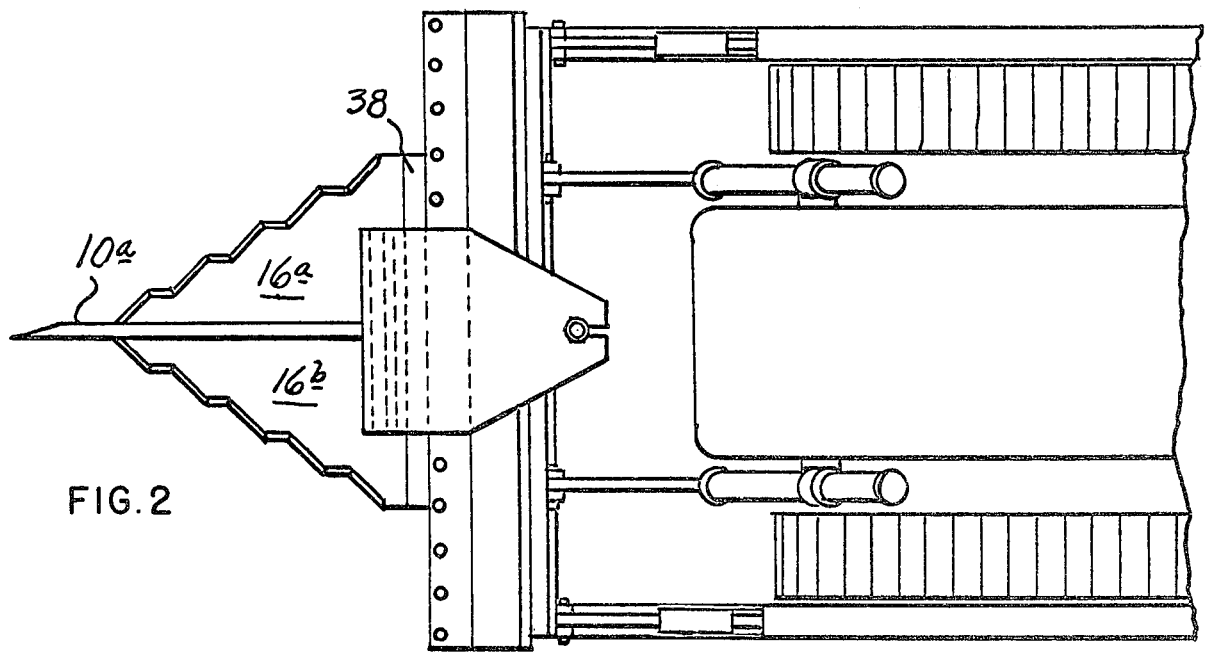
FIG. 2 is a plan view of FIG. 1.

Referring now to the drawings in detail, wherein like reference characters indicate like parts throughout the several figures, the reference numeral 10a indicates generally a sharp splitting blade.

The tree splitter shown in FIGS. 1 through 4 comprises a vertically edged blade 10a. On each side of blade 10a is a horizontal cut off blade 16a, and 16b so that if a tree is split by blade 10a the portions of the tree to each side will be cut off as the blades 16a and 16b advance, and support plate 12a.

Figure 3:
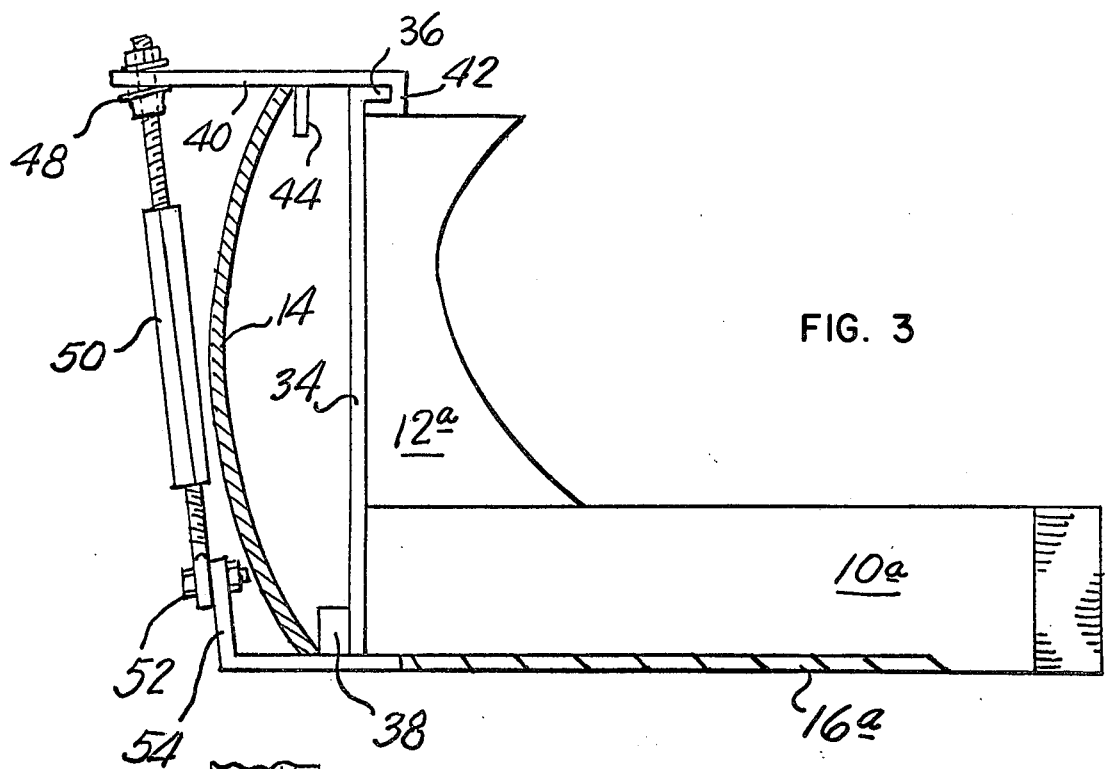
FIGS. 3 and 4 are enlarged side and top views respectively of the means to mount the splitter of FIGS. 1 and 2 on the bulldozer.
Figure 4:
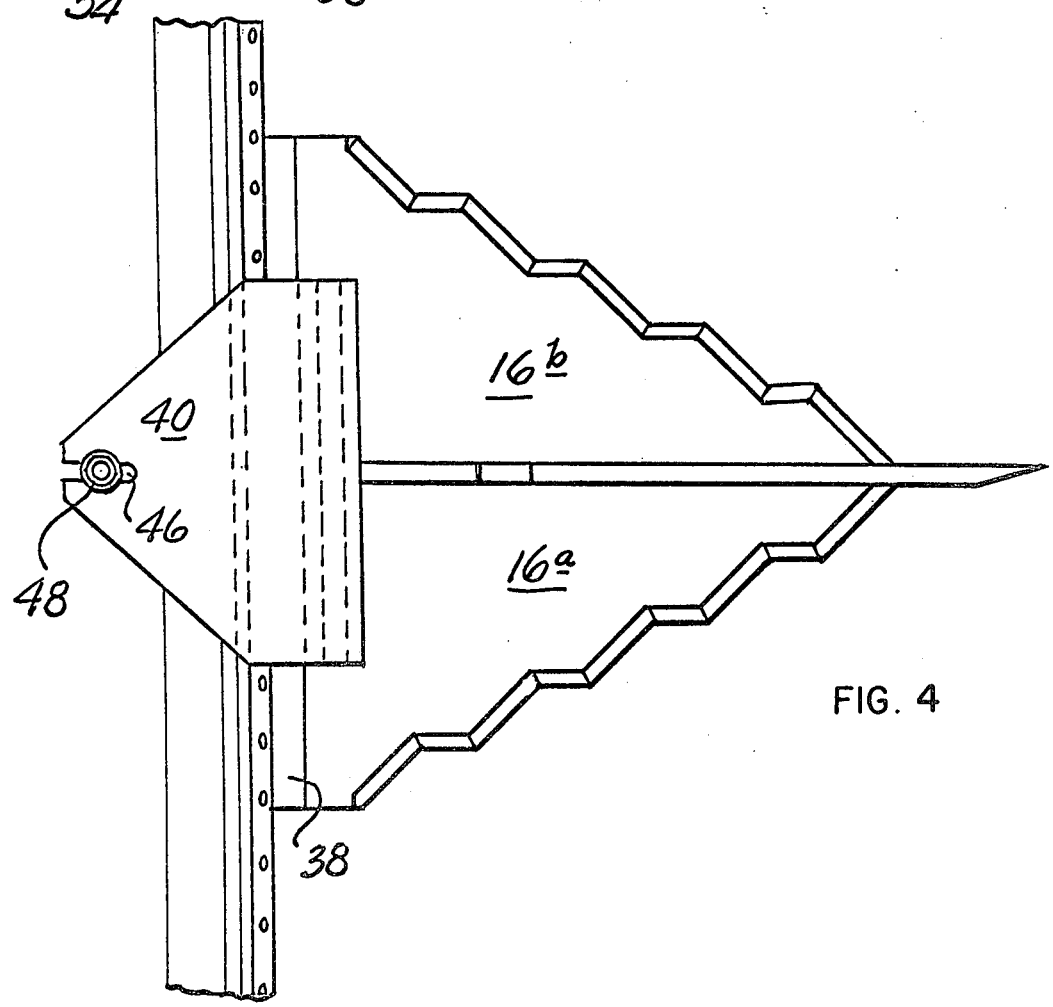

The means to secure the splitter of FIGS. 1 through 4 is shown most clearly in FIG. 3. This hitch is very simple. A generally vertical back plate 34 is provided that is secured, preferably by welding to the rear ends of cut off blades 16a and 16b and of splitter blade 10a and support plate 12a. Splitter blade 10a may be formed to extend only a short distance from its cutting edge and supported by support plate 12a.

Back plate 34 is provided with a forwardly extending flange 36. Preferably a square bar 38 is secured across the width of blades 16a, and 16b at the juncture of blades 16a and 16b with back plate 34. The lower edge of bulldozer blade 14 is to rest on blades 16a and 16b immediately behind and pressed against bar 38.

A top plate 40 having a hook portion 42 to receive the forwardly extending flange 36 of back plate 34 is provided to extend rearwardly over the top edge of bulldozer blade 14. A stop 44 is fixed on the lower surface of top plate 40 to bear against the top edge of bulldozer blade 14. An open slot 46 extends forwardly from the rear edge of top plate 40 to receive the nut 48 mounted on the upper end of turnbuckle 50. Nut 48 is provided with a squared portion that fits in slot 46 to prevent rotation of nut 48.

The lower end of turnbuckle 50 is secured by a bolt 52 to an upwardly extending tab 54 secured to the rear of blades 16a and 16b.

Mounting the stump splitter of this invention on a bulldozer blade is seen, therefore, to be very simple. It is only necessary to advance the bulldozer blade to bring its lower edge into position on the upper surface of cut off blades 16a and 16b and against bar 38. Hook portion 42 of top plate 40 is then engaged over flange 36 and moved rearwardly to bring stop 44 against the top edge of blade 14. Turnbuckle 50 is then swung up and nut 48 engaged in slot 46 of top plate 40. Turnbuckle 50 is then tightened and the stump splitter is mounted for use.

Having thus described the preferred embodiment of the invention it should be understood that numerous structural modifications and adaptations may be resorted to without departing from the spirit of the invention.

What is claimed is:

1. A stump splitter attachment for a bulldozer having a bulldozer blade, said attachment comprising a vertical sharp edged stump splitting blade extending forwardly of said attachment, at least one horizontally extending generally triangular cut off blade secured to said splitting blade from a position near the forward end of said splitting blade and having a rear edge lying in a plane normal to said splitting blade, and means to secure said attachment to the bulldozer blade in which said means to secure said attachment to the bulldozer blade includes back plate means secured to said cut off blade and extending in a plane normal to said splitting blade and rear edge of said cut off blade, said back plate being provided with a forwardly extending flange, a top plate formed with a hook portion to receive said forwardly extending flange, said top plate being provided with a stop means to engage a top edge of the bulldozer blade, a turnbuckle and means on the rear edges of said cut off blade and on said top plate to operatively engage ends of said turnbuckle, whereby said attachment may be securely clamped to said bulldozer blade by operation of said turnbuckle.

2. The device of claim 1 including two horizontally extending generally triangular cut off blades disposed on opposed sides of said splitting blade.

3. The device of claim 2 in which said splitting blade is provided with a support plate which extends up the vertical extent of said back plate.

* * * * *